(12) United States Patent
Inoue

(10) Patent No.: US 7,187,716 B2
(45) Date of Patent: Mar. 6, 2007

(54) VEHICLE MOUNTED DSRC APPARATUS

(75) Inventor: Masahiro Inoue, Tokyo (JP)

(73) Assignee: Mitsbuishi Denki Kabushiki Kaisha, Tokyo (JP)

(*) Notice: Subject to any disclaimer, the term of this patent is extended or adjusted under 35 U.S.C. 154(b) by 748 days.

(21) Appl. No.: 10/231,288

(22) Filed: Aug. 30, 2002

(65) Prior Publication Data

US 2003/0157888 A1    Aug. 21, 2003

(30) Foreign Application Priority Data

Feb. 20, 2002    (JP)    ............................ 2002-043057

(51) Int. Cl.
- *H04B 7/14*    (2006.01)
- *H04B 7/00*    (2006.01)
- *H03C 5/00*    (2006.01)
- *H04L 27/12*    (2006.01)

(52) U.S. Cl. ...................... 375/259; 375/268; 375/279; 455/23; 455/42

(58) Field of Classification Search ................ 375/279, 375/274, 271, 268, 261, 219, 300, 302, 303, 375/305, 308, 312, 320, 322, 323, 329, 334; 370/215, 204, 483; 455/23, 42, 73, 39, 78, 455/569.2, 572, 575.9, 108, 110, 127.1, 205
See application file for complete search history.

(56) References Cited

U.S. PATENT DOCUMENTS 5,504,774 A *    4/1996    Takai et al. .................. 375/134

2003/0157888 A1 *    8/2003    Inoue .......................... 455/41

FOREIGN PATENT DOCUMENTS

| JP | 03-283743 A | 12/1991 |
|---|---|---|
| JP | 08-102766 A | 4/1996 |
| JP | 08-130490 A | 5/1996 |
| JP | 2000-196690 A | 7/2000 |
| JP | 2001-307162 A | 11/2001 |

OTHER PUBLICATIONS

"Quadrature Amplitude Modulation", www.physics.udel.edu/ww-wuers/watson/student_projects/scen167/thosgys/qam.html, pp. 1-2.*

* cited by examiner

*Primary Examiner*—Kevin Kim
*Assistant Examiner*—Linda Wong
(74) *Attorney, Agent, or Firm*—Sughrue Mion, PLLC

(57) ABSTRACT

A vehicle mounted DSRC apparatus is capable of achieving reduction in the size and cost thereof. The vehicle mounted DSRC apparatus includes an ASK data generation part 11, an I data generation part 21, a Q data generation part 22, a first band limiting filter 23A for band limiting I data and ASK data, a second band limiting filter 24 for band limiting Q data, an ASK low pass filter 12A for removing harmonic components from the ASK data, first and second low pass filters 25, 26 for removing harmonic components from QPSK data, an ASK modulator 13 for ASK modulating the ASK data, a QPSK modulator 27 for QPSK modulating the QPSK data, and a power amplifier 30 for amplifying output data of the ASK modulator 13 or the QPSK modulator 27 to a desired level thereby to output it to an antenna as an ASK modulated signal and a QPSK modulated signal.

8 Claims, 11 Drawing Sheets

FIG. 11
PRIOR ART
OUTPUT WAVEFORMS OF ASK,I AND Q DATA 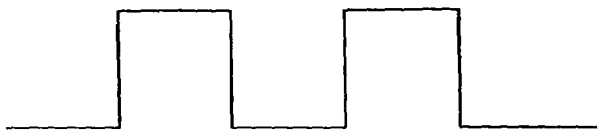
OUTPUT WAVEFORMS OF FILTERS 23,24 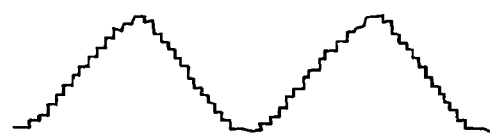
OUTPUT WAVEFORMS OF FILTERS 12,25,26 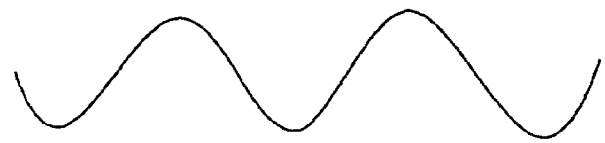
FIG. 12
PRIOR ART
12
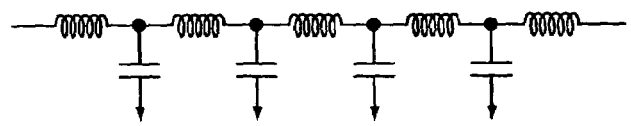
FIG. 13
PRIOR ART
25
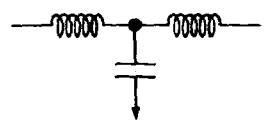

VEHICLE MOUNTED DSRC APPARATUS

This application is based on Application No. 2002-43057, filed in Japan on Feb. 20, 2002, the contents of which are hereby incorporated by reference.

BACKGROUND OF THE INVENTION

1. Field of the Invention

The present invention relates to a vehicle mounted dedicated short-range communication ((hereinafter referred to as DSRC) apparatus which receives transmission data from a ground or on-road device, and outputs an ASK modulated signal and a QPSK modulated signal by using a DSRC system in an intelligent transport system (hereinafter referred to as ITS) including ground devices. More specifically, it relates to a vehicle mounted DSRC apparatus which is capable of achieving reduction in its cost and size by sharing an ASK filter circuit with a QPSK filter circuit.

2. Description of the Prior Art

Conventionally, a DSRC system in association with an ITS has been known well as a system by which communicates are carried out only within a limited range on a road by using radio waves of a microwave band.

Such a kind of DSRC system is an effective system in which radio communications are carried out between a ground device arranged on a road and an on-vehicle device installed on a vehicle, whereby various services such as toll collection, traffic and road information services, etc., can be provided by mutually transferring various types of data between the ground device and the on-vehicle device, thus benefiting not only drivers but also administrators of roads, parking lots and so on.

As systems using DSRC, there have been thought various kinds of applications such as electronic toll collection (ETC) systems in expressways, charge collection systems in gas stations and drive throughs, traffic information services and so on.

Moreover, according to the DSRC standard for example, two modulation systems, ASK (Amplitude Shift Keying) modulation and QPSK (Quadrature Phase Shift Keying) modulation, are defined as modulation systems usable for various applications.

The above-mentioned ETC system has already been provided as an example of ASK modulation applications, and a charge settlement system for drive-throughs or gas stations is planned as an example of QPSK modulation applications.

FIG. 10 is a block diagram of a known vehicle mounted DSRC apparatus, showing the case where provision is made for an ASK modulation part 1 for generating an ASK modulated signal and a QPSK modulation part 2 for generating a QPSK modulated signal.

In FIG. 10, the vehicle mounted DSRC apparatus includes, in addition to the ASK modulation part 1 and the QPSK modulation part 2, a power amplifier (PA) 30 which amplifies modulation data from the modulation parts 1 and 2, a power supply 40 which supplies electric power to the modulation parts 1 and 2, respectively, a control part 100 which transmits and receives various data, and controls the modulation parts 1 and 2, respectively, an antenna 101 for data transmission and reception, and a transmission and reception switch 102 which is interposed between the antenna 101 and the control part 100, and between a power amplifier (PA) 30 and the control part 100.

A low noise amplifier (LNA) 103, a mixer (hereinafter referred to as "MIX") 104 and a demodulator 105 are interposed between the transmission and reception switch 102 and the control part 100.

In addition, connected to an output terminal of the control part 100 is an oscillation part 106 which generates a signaling frequency or frequency signal input to the respective modulation parts 1, 2 and the MIX 104.

The transmission and reception switch 102 performs the switching of transmission and reception of various data signals, so that radio waves can be transmitted and received through the antenna 101.

The low noise amplifier 103 serves to amplify received radio signals.

The MIX 104 converts a received frequency into a low frequency signal which is easy to handle, by using a frequency difference between the signaling frequency from the oscillation part 106 and the received frequency.

The demodulation part 105 detects the transmission data of the low frequency output from the MIX 104 and outputs it to the control part 100.

The ASK modulation part 1 includes an ASK data generation part 11 for generating transmission data for ASK use (i.e., ASK data), a band limiting filter 12 which constitutes a low pass filter (LPF) for ASK use (i.e., ASK low pass filter), and an ASK modulator 13 for ASK modulating the ASK data from the band limiting filter 12.

The ASK modulator 13 is operated by electric power supplied from the power supply 40.

The band limiting filter 12 performs the band limiting of transmission data (digital data) output by the ASK data generation part 11.

The ASK modulation data signal output from the ASK modulator 13 is amplified to a desired level by means of the power amplifier 30, and then sent to the transmission and reception switch 102 through which it is passed to the antenna 101 and is transmitted therefrom as a transmission microwave.

On the other hand, the QPSK modulation part 2 includes an I data generation part 21 for generating I channel data (hereinafter referred to as "I data") for QPSK use, a Q data generation part 22 for generating Q channel data (hereinafter referred to as "Q data") for QPSK use, a first band limiting filter (hereinafter simply referred to as "band limiting filter") 23 for limiting the band of the I data, and a second band limiting filter (hereinafter simply referred to as "band limiting filter") 24 for limiting the band of the Q data.

Also, the QPSK modulation part 2 further includes a low pass filter (LPF) 25 for rejecting or removing harmonic components from the I data which has passed through the band limiting filter 23, a low pass filter (LPF) 26 for rejecting or removing harmonic components from the Q data which has passed through the band limiting filter 24, and a QPSK modulator 27 for performing QPSK modulation based on the QPSK data (I data and Q data) output from the low pass filters 25, 26.

The QPSK modulator 27 is operated by electric power supplied from the power supply 40.

The ASK data generation part 11, the I data generation part 21 and the Q data generation part 22 generate ASK data or QPSK data under the control of the control part 100, but do not generate ASK data and QPSK data at the same time.

The signaling frequency output from the oscillation part 106 under the control of the control part 100 is input to the ASK modulator 13 and the QPSK modulator 27.

The QPSK modulation data signal output from the QPSK modulator 27 is amplified to a desired level by the power amplifier 30, and then sent to the transmission and reception switch 102 through which it is passed to the antenna 101 and transmitted therefrom as a transmission microwave.

The power amplifier 30 is commonly used for amplifying both the ASK modulated data and the QPSK modulated data.

In general, the band limiting filters 23, 24 in the QPSK modulation part 2 are each constituted by a DA converter, and hence the output signals of the band limiting filters 23, 24 include harmonic components (i.e., sampling noise) due to DA sampling. To remove the harmonic components, provision is made for low pass filters (LPFS) 25 and 26.

FIG. 11 is a waveform view showing the output waveforms of the respective parts in FIG. 10, including the output waveform (rectangular wave) of each of ASK data, I data and Q data, the output waveform (sine wave including harmonic components) of each of the band limiting filters 23, 24, and the output waveform (sine wave) of each of the band limiting filter 12 and the low pass filters 25, 26.

FIG. 12 is a circuit diagram showing an example of the configuration of the band limiting filter 12 in FIG. 10.

In FIG. 12, the band limiting filter 12 is constituted by a plurality of serially connected low pass filters (LPFs), i.e., multistage LC (reactor and capacitor) circuits.

FIG. 13 is a circuit diagram showing an example of the configuration of the low pass filter (LPF) 25 (or LPF 26) in FIG. 10.

In FIG. 13, the low pass filter 25 is constituted by a single LC circuit or a small number of LC circuits.

In general, in the vehicle mounted DSRC apparatus shown in FIG. 10, the band limiting filters 23, 24 in the QPSK modulation part 2 perform sampling at frequencies sufficiently higher than that of the transmission data. Accordingly, the low pass filters 25, 26 for sampling noise rejection can be implemented by a low-stage filter configuration as shown in FIG. 13.

In contrast to this, the band limiting filter 12 in the ASK modulation part 1 treats the rectangular wave of the ASK data (see FIG. 11) generated by the ASK data generation part 11. Thus, in order to limit the wide-band digital signal to a desired band, it becomes necessary to employ a high-stage filter configuration as shown in FIG. 12.

In addition, in the known vehicle mounted DSRC apparatus as shown in FIG. 10, it is necessary to concurrently arrange individual filter circuit configurations in the ASK modulation part 1 and in the QPSK modulation part 2, respectively.

With the known vehicle mounted DSRC apparatus as described above, the filter circuit configurations are individually provided in the ASK modulation part 1 and in the QPSK modulation part 2, respectively, which together constitute a transmission circuit, and hence the size of the circuit becomes large. As a result, there arise the following problems. That is, the cost of manufacture is increased, thus reducing user's purchasing interest or desire. Besides, the consumption of current increases, thereby increasing the calorific value of the apparatus.

In addition, there is another problem in that the overall shape of the known vehicle mounted DSRC apparatus becomes large, thus resulting in deteriorated installability on a vehicle, and in the worst case, it becomes impossible to install the apparatus in a user's desired installation place.

SUMMARY OF THE INVENTION

The present invention is intended to obviate the problems as referred to above, and has for its object to provide a vehicle mounted DSRC apparatus in which the circuit size thereof can be reduced, thereby making it possible to achieve reduction in overall size and cost thereof.

Bearing the above object in mind, the present invention resides in a vehicle mounted DSRC apparatus which uses a dedicated short range communications system of an intelligent transport system including ground devices, and which outputs an ASK modulated signal or a QPSK modulated signal in response to transmission data from one of the ground devices. The vehicle mounted DSRC apparatus includes: an antenna for receiving transmission data from the ground devices, and for transmitting the ASK modulated signal and the QPSK modulated signal to the ground devices; an ASK data generation part for generating ASK data in response to the transmission data; a QPSK data generation part for generating QPSK data containing I data and Q data in response to the transmission data; a first band limiting filter for band limiting one of the I data and the Q data in the QPSK data and the ASK data; a second band limiting filter for band limiting the other of the I data and the Q data in the QPSK data; and an ASK low pass filter for removing harmonic components from the ASK data which has passed through the first band limiting filter. The vehicle mounted DSRC apparatus further includes: a first low pass filter for removing harmonic components from the QPSK data which has passed through the first band limiting filter; a second low pass filter for removing harmonic components from the QPSK data which has passed through the second band limiting filter; an ASK modulator for ASK modulating the ASK data from the ASK low pass filter; a QPSK modulator for QPSK modulating the QPSK data from the first and second low pass filters; a power supply for supplying electric power to the ASK modulator and the QPSK modulator; and a power amplifier for amplifying output data from the ASK modulator or the QPSK modulator to a desired level thereby to output it to the antenna as the ASK modulated signal and the QPSK modulated signal.

With the above arrangement, it is possible to reduce the size and cost of the vehicle mounted DSRC apparatus.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 11 is a waveform view showing the output waveforms of respective parts in FIG. 10.

FIG. 12 is a circuit diagram showing an example of the configuration of a band limiting filter for ASK use in FIG. 10.

FIG. 13 is circuit diagram showing an example of the configuration of an low pass filter (LPF) in FIG. 10.

DESCRIPTION OF THE PREFERRED EMBODIMENTS

Hereinafter, preferred embodiments of the present invention will be described in detail while referring to the accompanying drawings.

Embodiment 1

Figure 1:
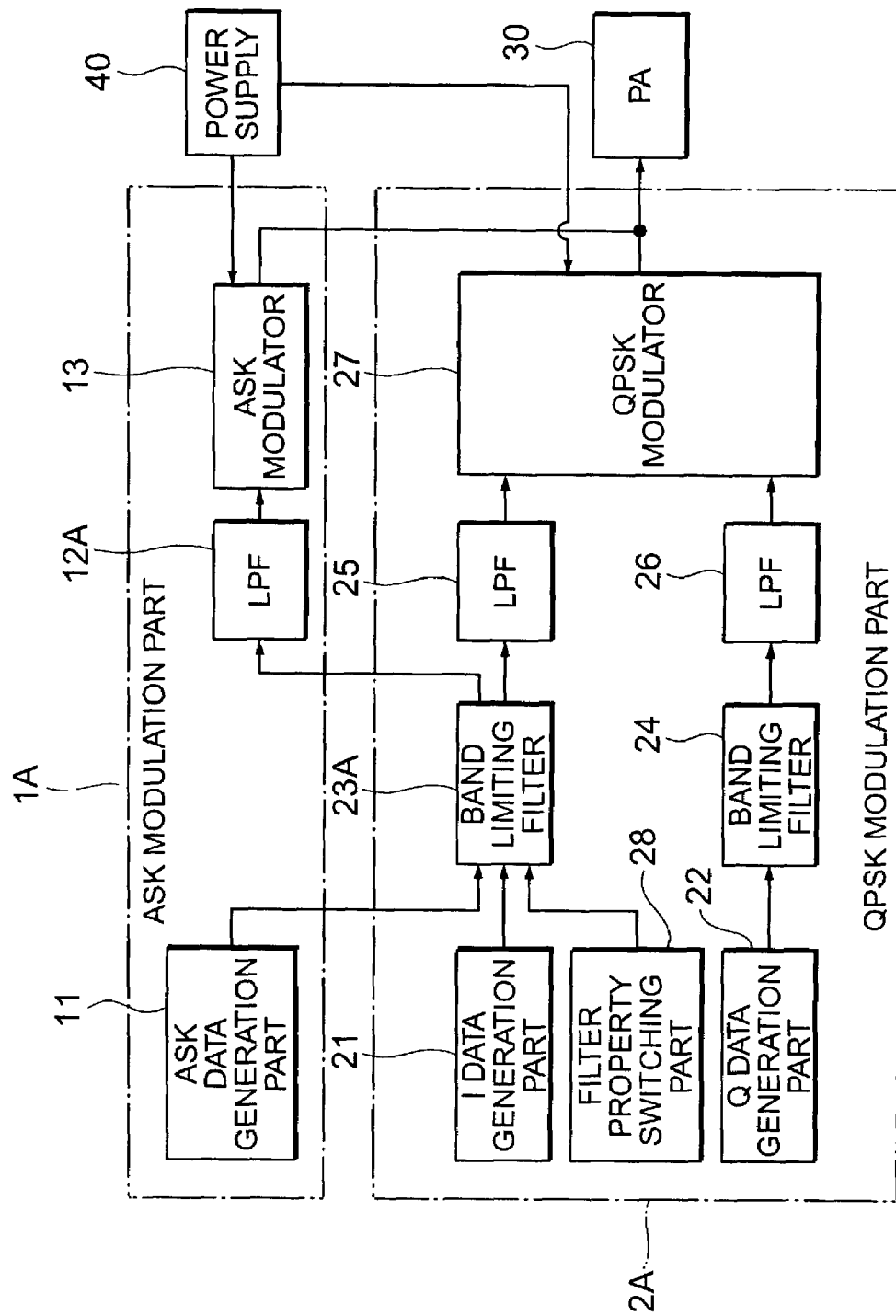
FIG. 1 is a block diagram showing a transmission part of a vehicle mounted DSRC apparatus according to a first embodiment of the present invention.

FIG. 1 is a block diagram which shows a transmission part of a vehicle mounted DSRC apparatus according to a first embodiment of the present invention.

In FIG. 1, the parts same as or corresponding to those described above (see FIG. 10) are identified by the same symbols or by the same symbols with "A" affixed to their ends, while omitting a detailed explanation thereof.

Figure 10:
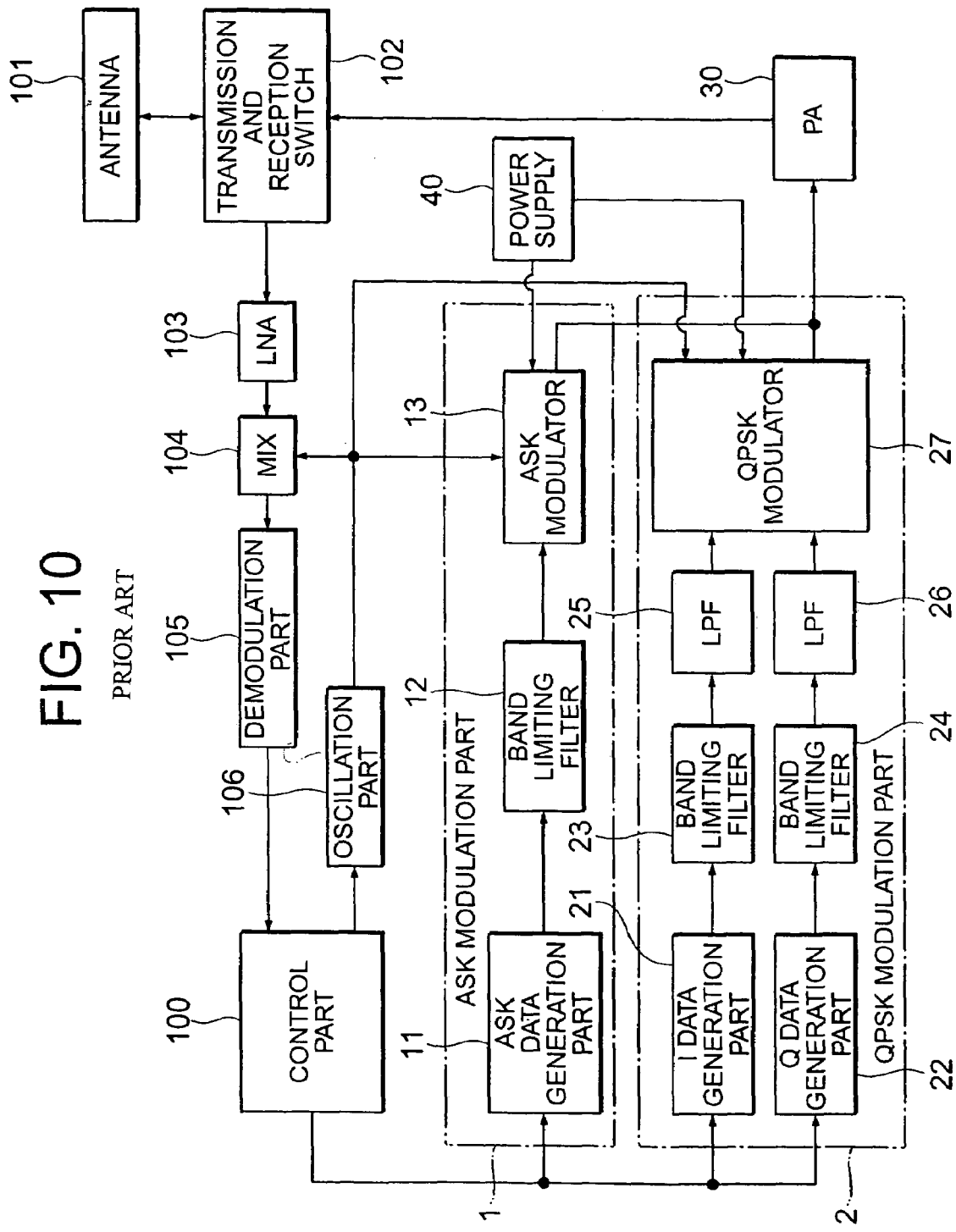
FIG. 10 is a block diagram showing a known vehicle mounted DSRC apparatus.

Moreover, the configuration of unillustrated parts (a control part 100, a receiving part, etc.) of this embodiment is the same as shown in FIG. 10.

In this embodiment, an ASK modulation part 1A includes substantially all the components of the aforementioned ASK modulation part 1 of FIG. 10 except for a low pass filter (LPF) 12A provided in place of the band limiting filter 12.

The low pass filter 12A is of a comparatively simple circuit structure as in the low pass filter (LPF) 25 (see FIG. 13) in a QPSK modulation part 2A.

On the other hand, a band limiting filter 23A in the QPSK modulation part 2A serves to limit not only the band of I data but also the band of ASK data.

In addition, the QPSK modulation part 2A includes a filter property switching part 28 which is operated under the control of the control part 100 (see FIG. 10).

The filter property switching part 28 performs switching between the filter properties of the band limiting filter 23A for the ASK data and for the QPSK data in response to transmission data from a ground or on-road device (not shown).

The output data from the ASK data generation part 11 and the I data generation part 21 is input through the band limiting filter 23A to the LPF 12A in the ASK modulation part 1A or to the LPF 25 in the QPSK modulation part 2A.

The ASK data from the LPF 12A is subjected to ASK modulation by the ASK modulator 13.

In addition, the QPSK data (i.e., I data in this case) from the LPF 25 together with the QPSK data (Q data) from the LPF 26 is subjected to QPSK modulation by the QPSK modulator 27.

Hereinafter, the modulated data from the respective modulators 13 and 27 are input to the transmission and reception switch 102 through the power amplifier (PA) 30, as described before with reference to FIG. 10. The ASK modulated signal or the QPSK modulated signal in response to the transmission data from the ground device is transmitted from the antenna 101 toward the ground device.

As shown in FIG. 1, the circuit configuration can be simplified by sharing the band limiting filter 23A for QPSK use, which consists of a DA converter, as a band limiting filter for the ASK data as well without using the band limiting filter 12 consisting of a multistage low pass filter (LPF) construction (see FIG. 12).

That is, the filter for ASK data in the ASK modulation part 1A can be constituted by the low-stage low pass filter (LPF) 12A which rejects or removes only the harmonic components due to DA sampling, without using a digital filter consisting of a DA converter, or a band limiting filter consisting of a high-stage low pass filter (LPF).

Moreover, when ASK data is to be treated, the filter property of the band limiting filter 23A is switched into ASK modulation use by the filter property switching part 28, whereas when I data for QPSK use is to be treated, it is switched into QPSK modification use for I data. As a result, it is possible to effectively cope with a situation where the frequency component of each data varies.

Here, note that the switching processing of the filter properties can be achieved only by digital data calculation since the band limiting filter 23A is a DA converter. Thus, the DA part of hardware can be completely shared irrespective of the difference in the data to be treated.

In addition, the vehicle mounted DSRC apparatus is constructed such that it performs transmission according to an instruction from the ground device, as described previously. Therefore, the ASK modulated data and the QPSK modulated data can not be transmitted at the same time. As a result, the filter for the ASK data and the filter for I data can be shared with each other.

Further, although one filter is shared for ASK data and for I data for QPSK use in the configuration of FIG. 1, the filter for the ASK data and the filter for Q data for QPSK use (i.e., the band limiting filter 24) may share a single filter.

Furthermore, although the filter property switching part 28 is provided in consideration of the difference in the frequency components of ASK data and I data, the filter property switching part 28 may be omitted if the frequency components of the respective data are regarded as almost the same.

Embodiment 2

Although in the above-mentioned first embodiment, the LPF 12A is provided in the ASK modulation part 1A, the LPF 25 in the QPSK modulation part 2A may be used for carrying out the function of the LPF 12A.

Figure 2:
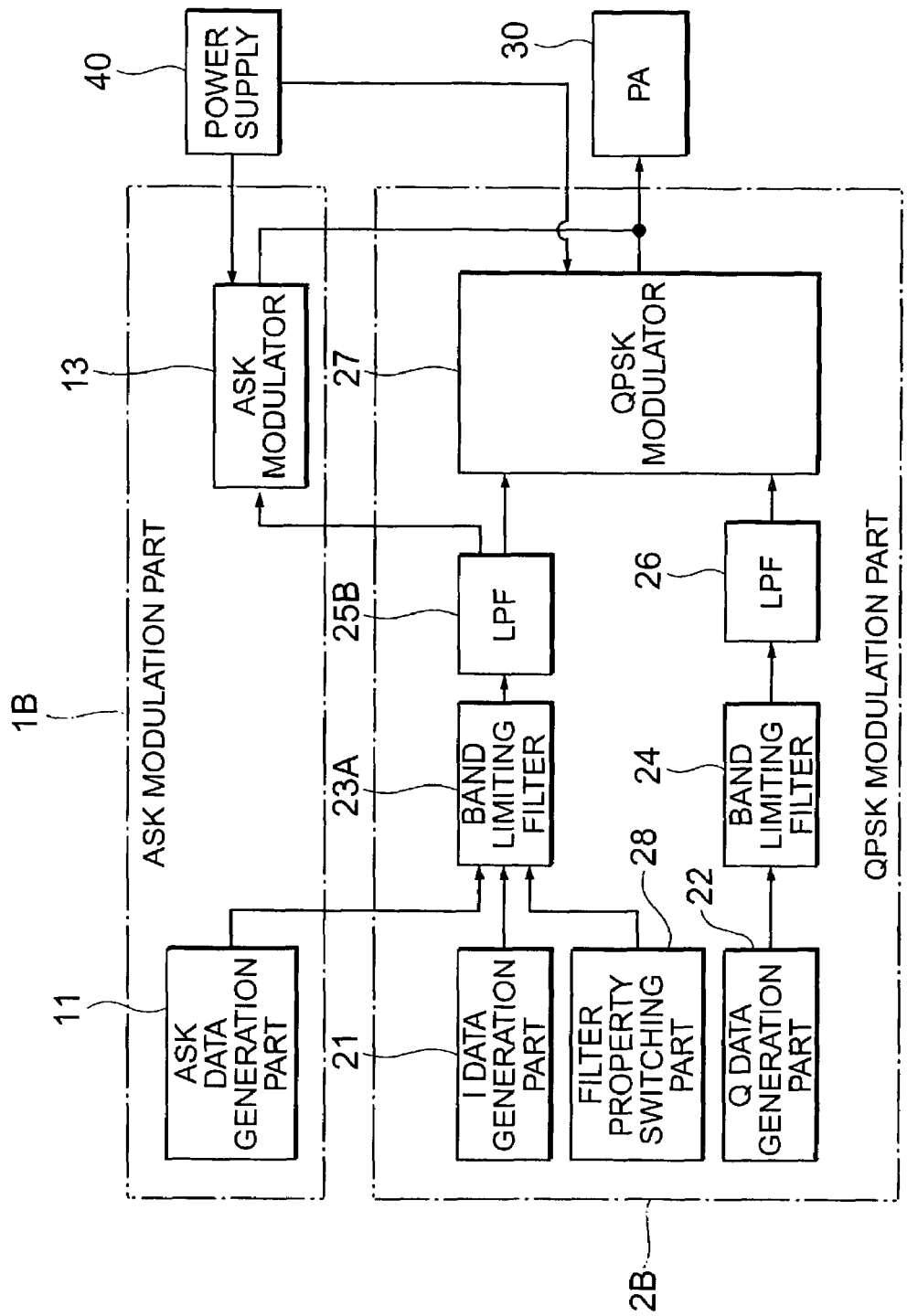
FIG. 2 is a block diagram showing a transmission part of a vehicle mounted DSRC apparatus according to a second embodiment of the present invention.

FIG. 2 is a block diagram showing a transmission part according to a second embodiment of the present invention, wherein the LPF in the QPSK modulation part is used for the LPF for ASK data.

In FIG. 2, the parts same as or corresponding to those in the above-mentioned first embodiment (see FIG. 1) are identified by the same symbols or by the same symbols with "B" affixed to their ends, while omitting a detailed explanation thereof.

In this embodiment, the ASK modulation part 1B is not provided with the LPF 12A (see FIG. 1), but with the ASK data generation part 11 and the ASK modulator 13 alone.

On the other hand, the LPF 25B in the QPSK modulation part 2A also has the LPF function for ASK data and rejects or removes the harmonic components of both the ASK data and the I data from the band limiting filter 23A.

In general, in DSRC communications, data transmission is carried out by the use of Manchester codes. QPSK uses data transmission of "4096 Kbps", whereas ASK uses data transmission of "1024 Kbps".

Note that QPSK can transmit two bits per symbol, and hence the actual data speed corresponds to "2048 Kbps".

On the other hand, ASK performs Manchester coding (i.e., one data being encoded to the data of "H→L" or "L→H"), and hence the actual data speed corresponds to "2048 Kbps".

Accordingly, the output data speeds (frequency components of transmission data) of ASK and QPSK become the same, so only the harmonic components can be easily removed or rejected by the same LPF 25B. As a result, the LPF 25B in the QPSK modulation part 2A can be used as the LPF for ASK use.

That is, the LPF 25B is inserted for removing the harmonic components of DA sampling, so that it can remove the oversampled frequency components due to DA sampling while passing the frequency components of transmission data.

Therefore, the LPF 25B for removing the harmonic component of the I data for QPSK use can be used as a filter for removing the harmonic component of the ASK data. As a result, further reduction in size and cost of the apparatus can be achieved.

Incidentally, note that even when the data speeds for QPSK and ASK are different from each other by two times or so, the DA sampling frequency is different from the data frequency by about 8 times or 16 times (see the output waveform of the filter 23 in FIG. 11). Thus, a simple circuit configuration or structure as shown in FIG. 13 can be used as the shared LPF 25B.

Embodiment 3

Although in the above-mentioned second embodiment, no consideration is given to an ON/OFF switch which is related to the power supply 40, provision may be made for an ON/OFF switch for suppying power to the ASK modulator 13 and the QPSK modulator 27 in such a manner that one of the ASK modulator 13 and the QPSK modulator 27 can be selectively supplied with power as necessary.

Figure 3:
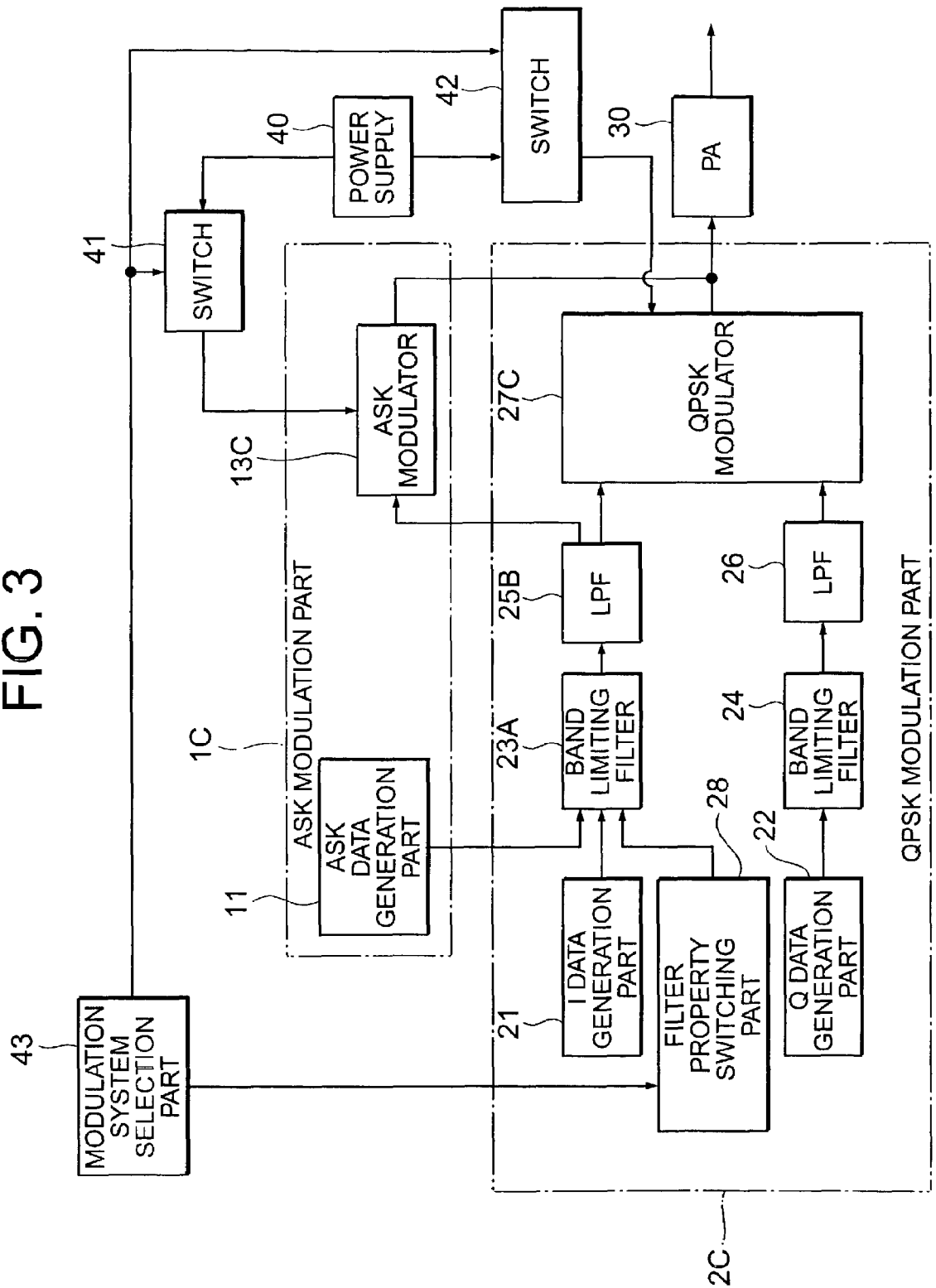
FIG. 3 is a block diagram showing a transmission part of a vehicle mounted DSRC apparatus according to a third embodiment of the present invention.

FIG. 3 is a block diagram showing a transmission part according to a third embodiment of the present invention, in which a switch is provided for turning on and off the supply of power from the power supply 40.

In FIG. 3, the parts same as or corresponding to those in the above-mentioned first and second embodiments (see FIG. 1 and FIG. 2) are identified by the same symbols or by the same symbols with "C" affixed to their ends, while omitting a detailed explanation thereof.

In this case, switches 41, 42 adapted to be turned on and off by a modulation system selection part 43 are interposed between the power supply 40 and an ASK modulator 13C, and between the power supply 40 and an QPSK modulator 27C, respectively.

The modulation system selection part 43 is constituted as a partial function of the control part 100 (see FIG. 10), and serves to generate a switching instruction to the filter property switching part 28 in response to transmission data from a ground device.

The ASK modulator 13C in an ASK modulation part 1C is supplied with electric power when the switch 41 is turned on, whereas the QPSK modulator 27C in a QPSK modulation part 2C is supplied with electric power when the switch 42 is turned on.

That is, when ASK modulation is to be performed, the modulation system selection part 43 turns on the switch 41 for ASK use and turns off the switch 42 for QPSK use, whereas when QPSK modulation is to be perofmed, the modulation system selection part 43 turns on the switch 42 for QPSK use and turns off the switch 41 for ASK use. In this manner, the power supply 40 is selectively connected only to a circuit which is required to operate.

Next, the modulation system switching processing operation according to the third embodiment of the present invention shown in FIG. 3 will be described while referring to a flow chart of FIG. 4.

Figure 4:
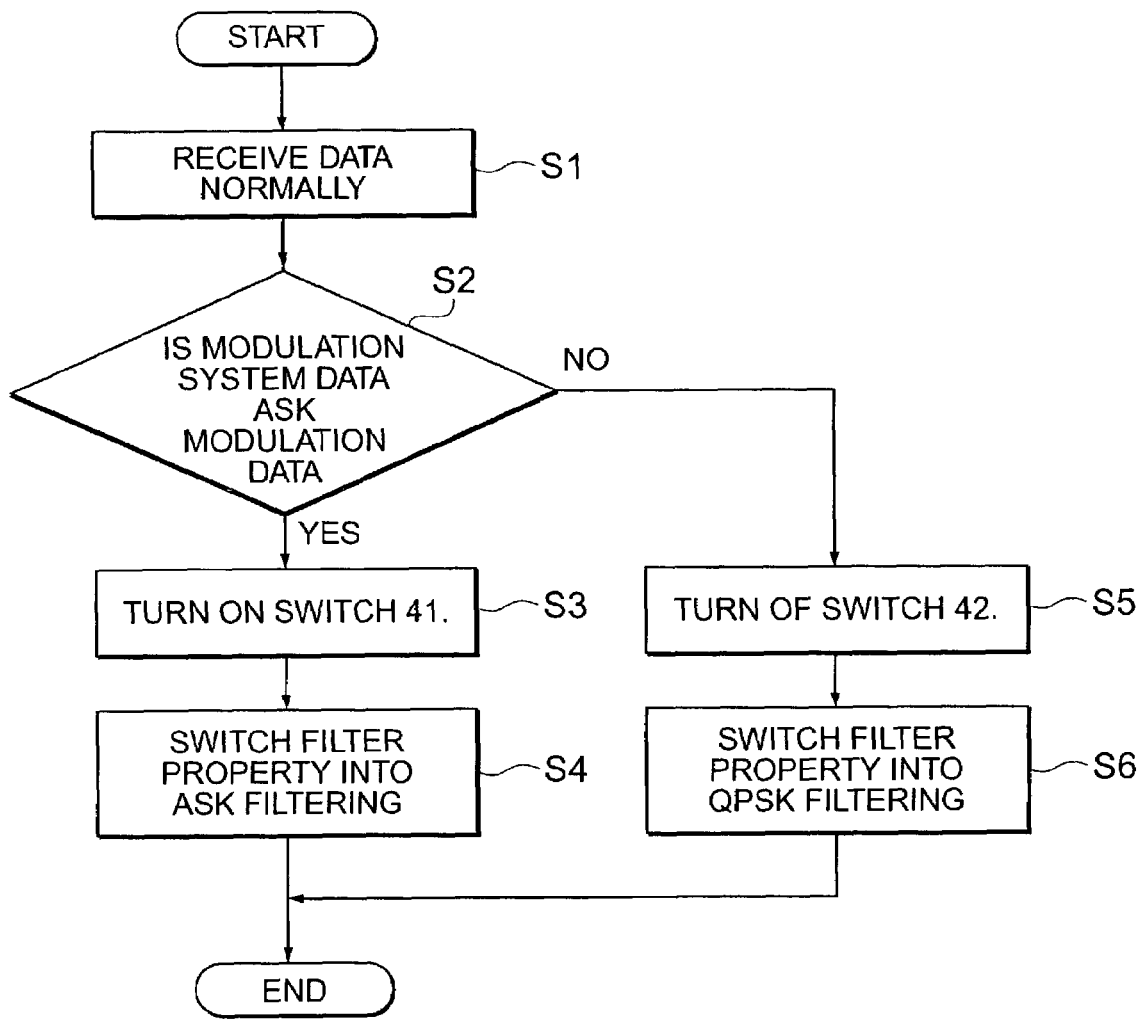
FIG. 4 is a flow chart showing a switch and its switching operation for the filter property according to the third embodiment of the present invention.

In FIG. 4, the vehicle mounted DSRC apparatus first receives transmission data from a ground device in a normal manner (step S1).

At this time, the transmission data contains the data for deciding a modulation system. For instance, there may a system in which after a call has been made according to ASK modulation, data communications are carried out according to QPSK modulation.

Accordingly, following the reception of the transmission data (step S1), it is determined whether the modulation system in the transmission data is the ASK modulation system (step S2).

If determined in step S2 that it is the ASK modulation system (that is, YES), the switch 41 for ASK use is turned on (step S3), thus switching the filter property to ASK modulation (step S4), and the processing routine of FIG. 4 is ended.

On the other hand, if determined in step S2 that it is not the ASK modulation system (that is, NO), the switch 42 for QPSK use is turned on (step S5), thus switching the filter property to QPSK moulation (step S6), and the processing routine of FIG. 4 is ended.

In this manner, the processing of switching between ASK moudulation and QPSK modulation is performed by turning on and off the switches 41, 42 according to the modulation system instruction signal contained in the transmission data from the ground device.

Therefore, the supply of power to the ASK modulator 13 and the QPSK modulator 27 can be individually turned on and off as necessary. As a result, not only the circuit configuration but also the power consumption for the power supply 40 can be reduced to a necessary minimum, thus making it possible to suppress the power consumption and heat generation of the entire vehicle mounted DSRC apparatus.

Embodiment 4

Although in the above-mentioned second embodiment, the ASK modulator 13 and the QPSK modulator 27 are individually or separately provided, the QPSK modulator 27 may be used as an ASK modulator.

Figure 5:
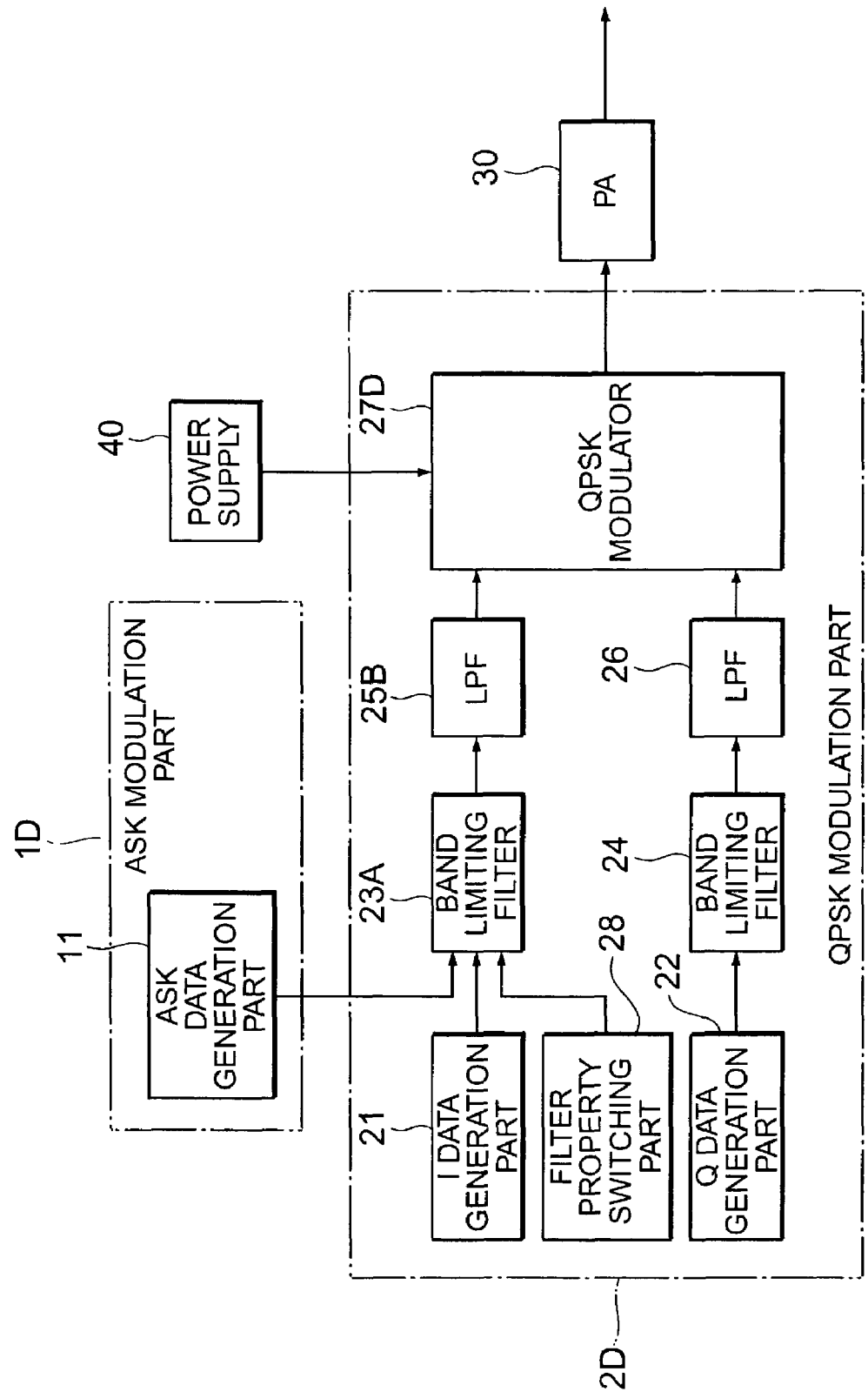
FIG. 5 is a block diagram showing a transmission part of a vehicle mounted DSRC apparatus according to a fourth embodiment of the present invention.

FIG. 5 is a block diagram showing a transmission part according to a fourth embodiment of the present invention, in which the QPSK modulator is also used for ASK modulation.

In FIG. 5, the parts same as or corresponding to those in the above-mentioned first and second embodiments (see FIG. 1 and FIG. 2) are identified by the same symbols or by the same symbols with "D" affixed to their ends, while omitting a detailed explanation thereof.

In this embodiment, an ASK modulation part 1D is not provided with the ASK modulator 13, but with the ASK data generation part 11 alone.

On the other hand, the QPSK modulator 27D in a QPSK modulation part 2D shares the function of the ASK modulator, and hence modulates both ASK data and QPSK data received from the LPF 25B.

Next, the concrete switching operation of the QPSK modulator 27D according to the fourth embodiment of the present invention shown in FIG. 5 will be described while referring to FIGS. 6 and 7, which illustrate the configuration and operation of a general QPSK modulator 27.

Figure 6:
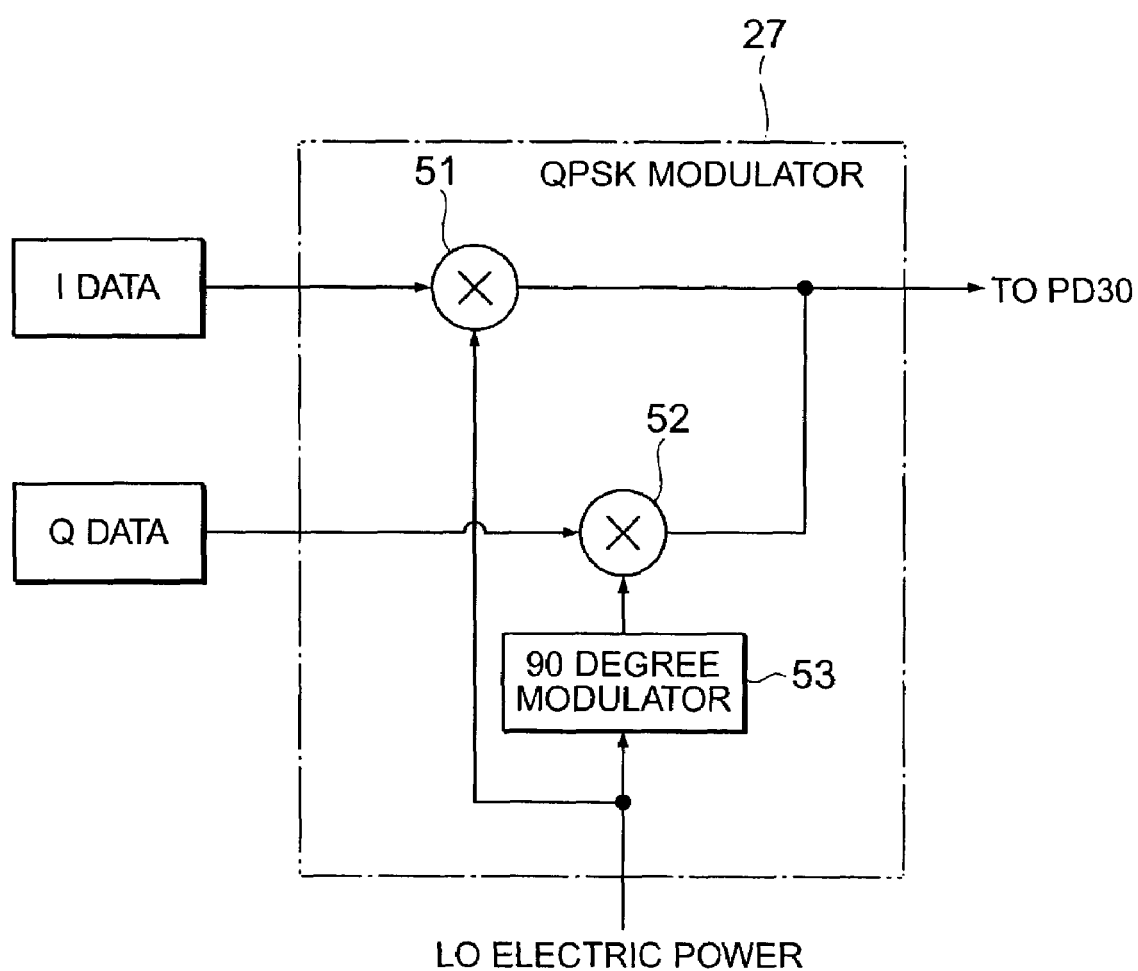
FIG. 6 is a circuit configuration diagram showing a QPSK modulator according to the fourth embodiment of the present invention.

FIG. 6 is a circuit configuration diagram showing the general QPSK modulator 27 which uses two binary PSK (Phase Shift Keying) modulators.

Figure 7:
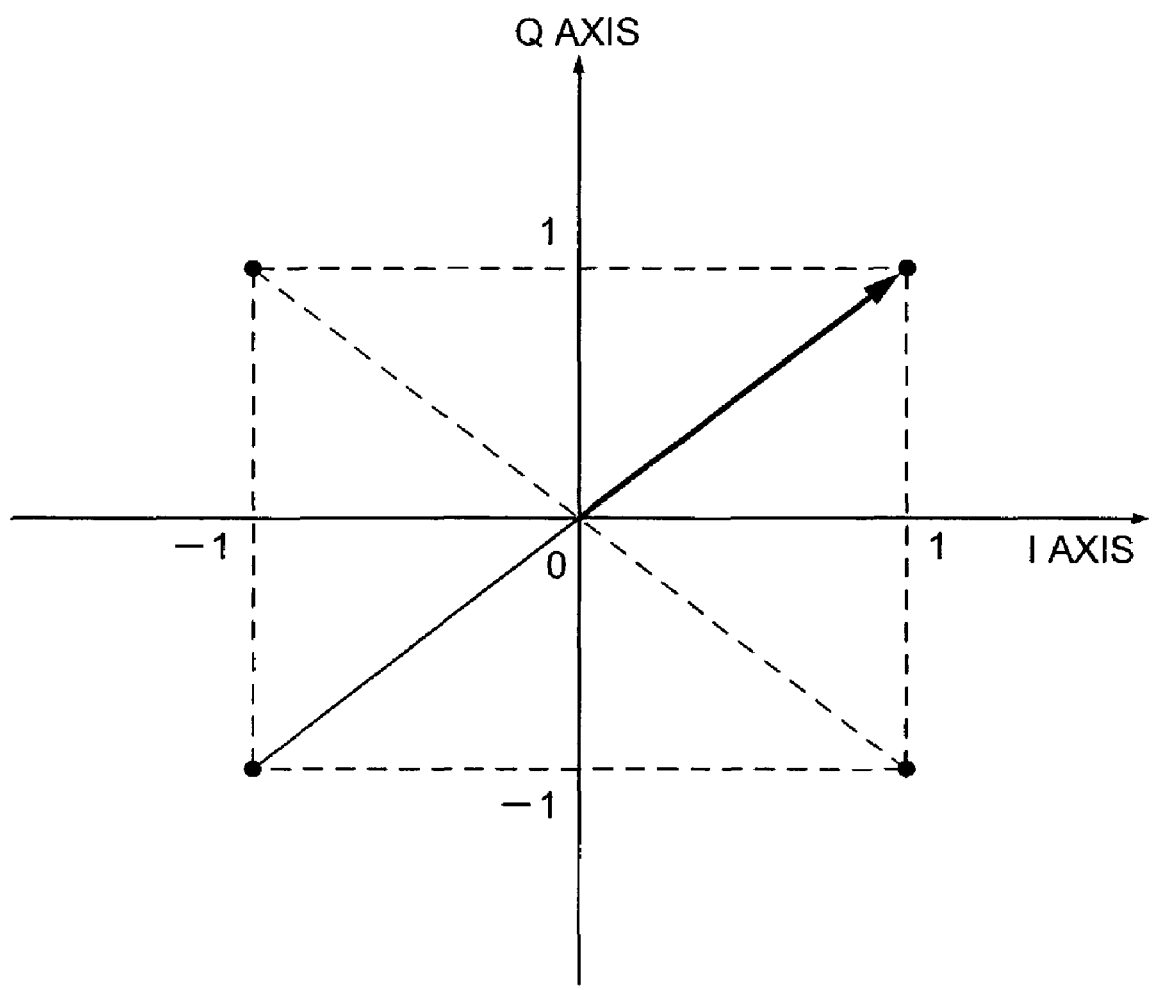
FIG. 7 is an I axis—Q axis characteristic chart to explain the amplitude modulation processing operation of the QPSK modulator according to the fourth embodiment of the present invention.

FIG. 7 is an explanatory view in which an I-Q characteristic according to the general QPSK modulator 27 is shown in a vector phase space.

In FIG. 6, the QPSK modulator 27 is provided with binary PSK modulators 51, 52 corresponding to I data and Q data, respectively, and a 90 degree phaser 53 inserted in a local (Lo) electric power input terminal side of one PSK modulator 52 for supplying local (Lo) electric power to the PSK modulators 51 and 52, respectively, with a phase difference of 90 degrees.

The local (Lo) electric power has a frequency of several GHZ and is supplied from the control part 100 through the oscillation part 106 (see FIG. 10).

As shown in FIG. 6, the general QPSK modulator 27 is constituted by the two PSK modulators (phase modulators) 51, 52 whose output voltage phases change to the input voltage within a range of from +90 degrees to −90 degrees (a phase difference of 180 degrees), i.e., with a phase difference of 90 degrees with respect with each other.

In this case, ASK modulation can be performed by changing the input value of only I data between "1" (or "−1") and "0" while fixing Q data for the one PSK modulator 52 to a prescribed value (for instance, "0").

This can be understood from an amplitude component (see an arrow) of a vector diagram in FIG. 7.

In FIG. 7, the phase changes in the direction of an I axis (the horizontal axis) for an I axis input, and in the direction of a Q axis (the vertical axis) for a Q axis input, and hence "four values" can be expressed by a phase difference of 90 degrees.

At this time, a point (filled circle) represented by an IQ synthesized vector in FIG. 7 becomes QPSK transmission data. The distance (see arrow) from a "0 point" shown at the center becomes an amplitude component of a data waveform.

In the QPSK modulator 27D having the I-Q characteristic of FIG. 7, a value between −1 and +1 can usually be input as each data value. However, here let us assume, as an example, that the input value for Q data is fixed to "0" and only the input value for I data is varied between "0" and "1".

At this time, when the I data input value is "1", a vector-synthesized arrow (i.e., amplitude component) becomes a maximum magnitude of "1", whereas when the I data input value is "0", it becomes a minimum amplitude of "0" (absence of an amplitude).

As a result, it follows that the input data is subjected to amplitude-modulation phase modulation, and hence this corresponds to performing ASK modulation.

Here, it is to be noted that the I data input value at this time may be "−1" and "0" or arbitrary two values within the range of from "−1" to "+1".

In this manner, by using the variable amplitude characteristic of the QPSK modulator 27, it becomes possible for the QPSK modulator 27D of the configuration as shown in FIG. 5 to function not only for QPSK modulation but also for ASK modulation so as to output both QPSK modulated data and ASK modulated data.

Accordingly, the circuit configuration of the apparatus can be further simplified, thereby achieving reduction in the size and cost thereof.

Embodiment 5

Although in the above-mentioned fourth embodiment, no concrete mention has been made to an input fixing part for fixing one of the data values input to the QPSK modulator, such an input fixing part may be provided in the QPSK modulator.

Figure 8:
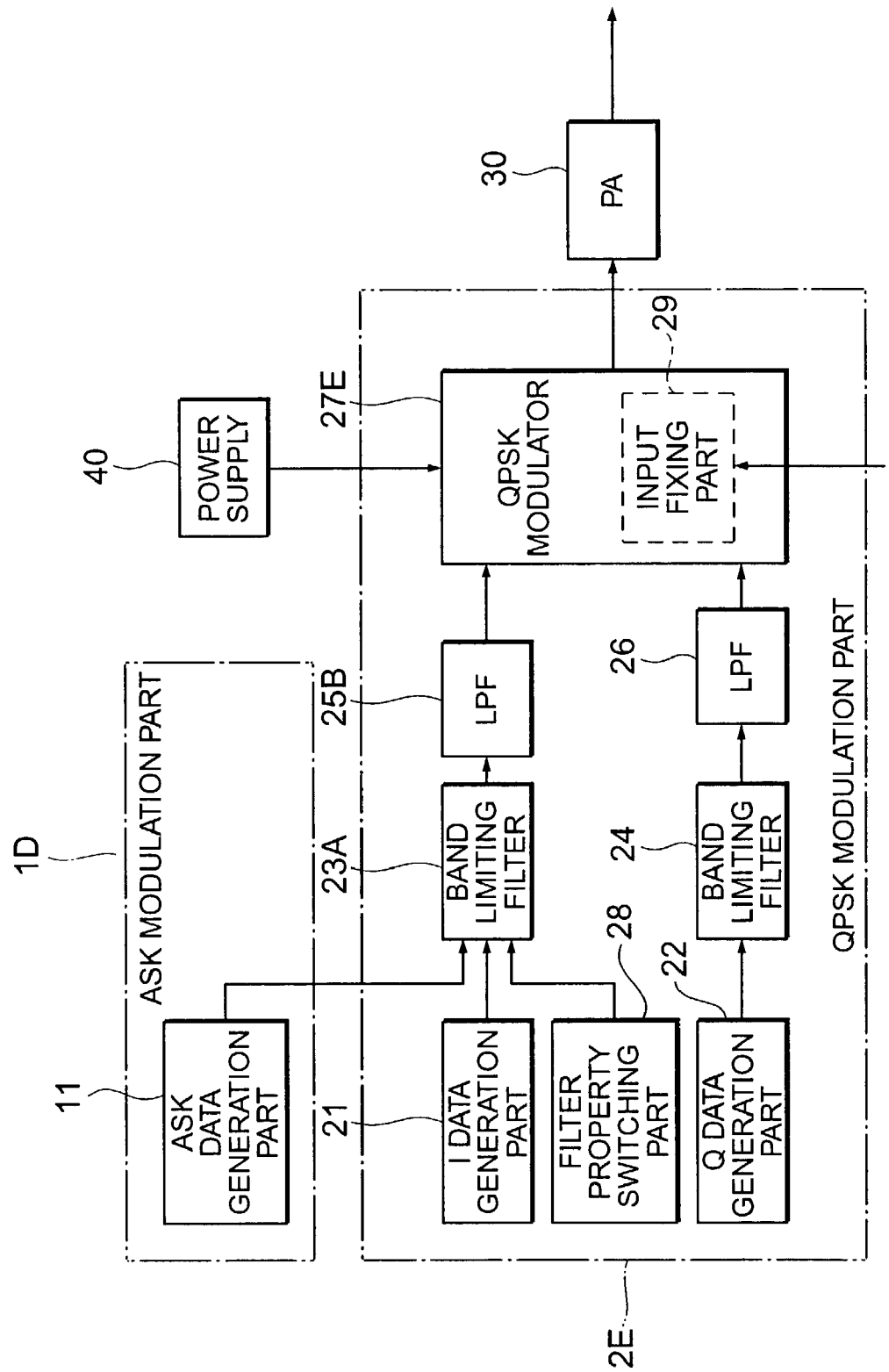
FIG. 8 is a block diagram showing a transmission part of a vehicle mounted DSRC apparatus according to a fifth embodiment of the present invention.

FIG. 8 is a block diagram showing a transmission part according to a fifth embodiment of the present invention, in which provision is made for an input fixing part in the QPSK modulator.

In FIG. 8, the parts same as or corresponding to those in the above-mentioned fourth embodiment (see FIG. 5) are identified by the same symbols or by the same symbols with "E" affixed to their ends, while omitting a detailed explanation thereof.

In this embodiment, a QPSK modulator 27E is provided with an input fixing part 29 for fixing one of the input values of QPSK data (e.g., Q data).

The input fixing part 29 is operated in response to a fixed input signal from the control part 100 (see FIG. 10).

As shown in FIG. 8, by the provision of the input fixing part 29, when ASK data is selected, the Q data input value through the LPF 26 can be fixed to a prescribed value (e.g., "0") in a reliable manner, so that the QPSK modulator 27E can be made to function as an ASK modulator as described above.

Here, note that in FIG. 8, the LPF 25B on the I channel side is also used for ASK, so Q data is fixed to the prescribed value upon selection of ASK. However, it is needless to say that when the LPF 26 on the Q channel side is used for ASK, I data is fixed upon selection of ASK.

Moreover, the QPSK data input value, which is fixed upon selection of ASK, is not necessarily limited to "0", but may instead be set to any value within the range of from "−1" to "+1".

That is, even if the fixed value is arbitrarily set, it is possible to perform the amplitude modulation. Accordingly, the fixed data input value may be properly set to a value other than "0", while providing substantially the same operational effects as described above.

Embodiment 6

Although in the above-mentioned fifth embodiment, the input fixing part 29 is provided in the QPSK modulator and used as an ASK modulator as well, the QPSK modulator may be constituted by two binary PSK modulators whose input values are made to change to the same value when ASK is selected.

Figure 9:
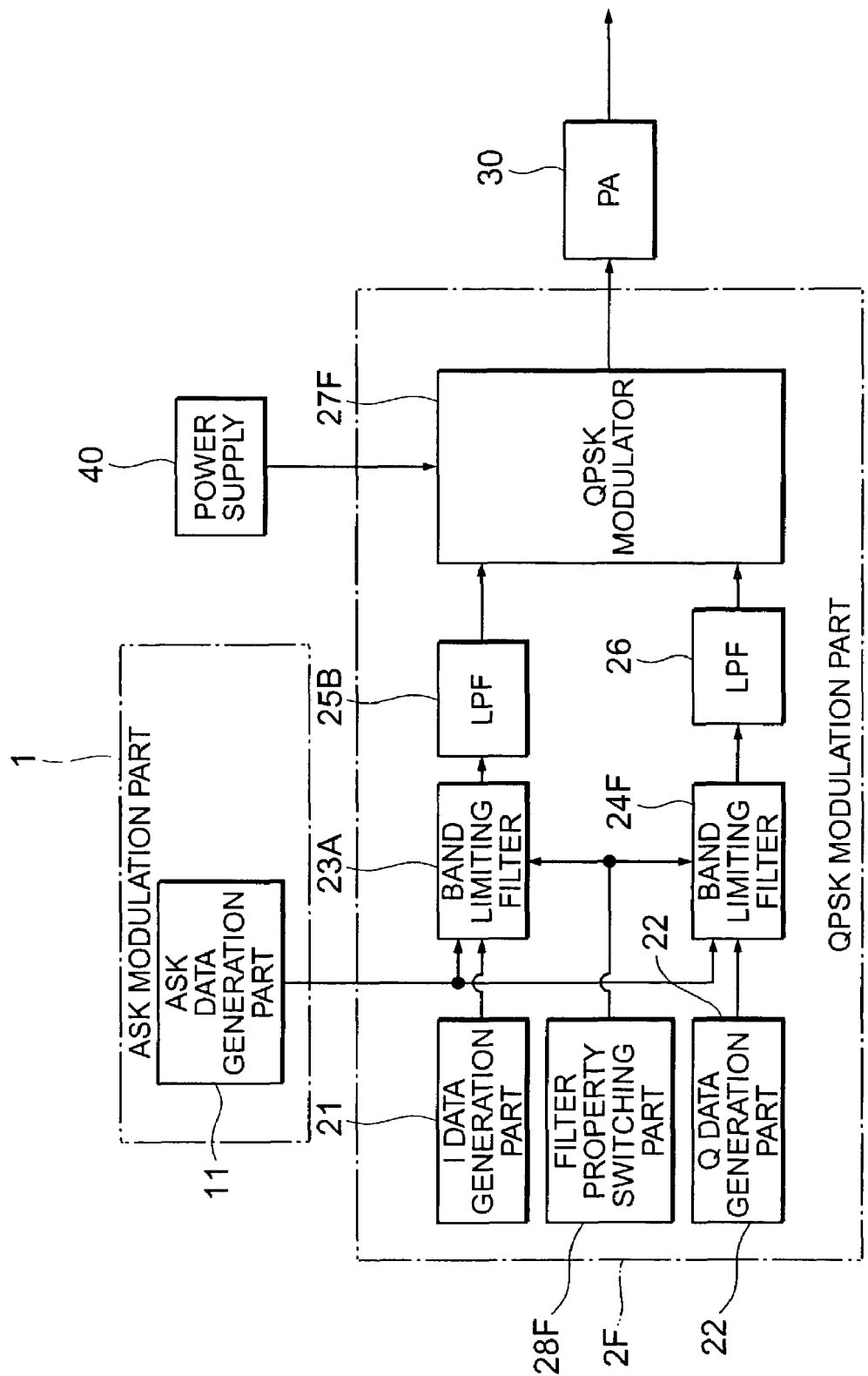
FIG. 9 is a block diagram showing a transmission part of a vehicle mounted DSRC apparatus according to a sixth embodiment of the present invention.

FIG. 9 is a block diagram showing a transmission part according to a sixth embodiment of the present invention, in which two binary PSK modulators are used.

In FIG. 9, the parts same as or corresponding to those in the above-mentioned fourth and fifth embodiments (see FIG. 5 and FIG. 8) are identified by the same symbols or by the same symbols with "F" affixed to their ends, while omitting a detailed explanation thereof.

In this embodiment, the ASK data from the ASK data generation part 11 is input to both of band limiting filters 23A, 24F in a QPSK modulation part 2F.

In addition, when ASK is selected, a filter property switching part 28F in the QPSK modulation part 2F serves to switch the filter properties of both of the band limiting filters 23A, 24F.

That is, a QPSK modulator 27F is constituted by two PSK modulators 51, 52 as in the above-mentioned fourth embodiment (see FIG. 6), to which I data and Q data of the same value are input upon selection of ASK.

For instance, as can be readily seen from FIG. 7, by changing both the I data input value and the Q data input value to "0" or "1" at the same time when ASK is selected, the amplitude components of the input data are amplitude-modulated to a "point 0" and a "head of an arrow", respectively, in FIG. 7, whereby the ASK modulation is carried out.

Alternatively, by changing both the I data input value and the Q data input value to "−1" or "0" at the same time, the ASK modulation can be similarly performed in the third quadrant in FIG. 7.

As a result, it is possible to make the input fixing part 29 (see FIG. 8) in the QPSK modulation part 2F unnecessary, thus achieving further reduction in cost.

Moreover, by inputting the same signal to the QPSK modulator 27F as I data and Q data for QPSK use, the two PSK modulators 51, 52 can be operated in synchronization with each other so that variations in the ground levels or the like are offset or cancelled out with each other, thus making it possible to stabilize the operation of the ASK modulator.

Although in the above-mentioned first through sixth embodiments, there has been described the case in which data system being shared with ASK data is QPSK, the present invention can also be applied to a π/4 shifted QPSK. In this case, a difference is only in the method of processing of the data generation part, while providing the similar operational effects as described above with substantially the same circuit configuration.

Further, a passive filter (see FIG. 13) in the form of the LC circuit has been used as each simplified LPF, but an active filter such as an operational amplifier or the like may also be employed.

Furthermore, although in the QPSK modulation part, the band limiting filter on the I channel side has been used for ASK as well, the band limiting filter on the Q channel side may be employed for the same purpose (i.e., ASK use).

As described in the foregoing, the present invention can provide the following advantages.

According to the present invention, there is provided a vehicle mounted DSRC apparatus which uses a dedicated short range communications system of an intelligent transport system including ground devices, and which outputs an ASK modulated signal or a QPSK modulated signal in response to transmission data from one of the ground devices. The vehicle mounted DSRC apparatus comprises: an antenna for receiving transmission data from the ground devices, and for transmitting the ASK modulated signal and the QPSK modulated signal to the ground devices; an ASK data generation part for generating ASK data in response to the transmission data; a QPSK data generation part for generating QPSK data containing I data and Q data in response to the transmission data; a first band limiting filter for band limiting one of the I data and the Q data in the QPSK data and the ASK data; a second band limiting filter for band limiting the other of the I data and the Q data in the QPSK data; an ASK low pass filter for removing harmonic components from the ASK data which has passed through the first band limiting filter; a first low pass filter for removing harmonic components from the QPSK data which has passed through the first band limiting filter; a second low pass filter for removing harmonic components from the QPSK data which has passed through the second band limiting filter; an ASK modulator for ASK modulating the ASK data from the ASK low pass filter; a QPSK modulator for QPSK modulating the QPSK data from the first and second low pass filters; a power supply for supplying electric power to the ASK modulator and the QPSK modulator; and a power amplifier for amplifying output data from the ASK modulator or the QPSK modulator to a desired level thereby to output it to the antenna as the ASK modulated signal and the QPSK modulated signal. With the above arrangement, it is possible to reduce the size and cost of the vehicle mounted DSRC apparatus.

In a preferred form of the present invention, the vehicle mounted DSRC apparatus further comprises a filter property switching part for switching the filter property of the first band limiting filter in response to transmission data from one of the ground devices.

Thus, even when ASK data with a different frequency component is selected, the size and cost of the vehicle mounted DSRC apparatus can be reduced.

In another preferred form of the present invention, the ASK low pass filter comprises the first low pass filter. Thus, it is possible to reduce the size and cost of the vehicle mounted DSRC apparatus.

In a further preferred form of the present invention, the vehicle mounted DSRC apparatus further comprises: an ASK switch inserted between the power supply and the ASK modulator for turning on and off the supply of electric power to the ASK modulator; a QPSK switch inserted between the power supply and the QPSK modulator for turning on and off the supply of electric power to the QPSK modulator; and a modulation system selection part for turning on only one of the ASK switch and the QPSK switch. Accordingly, the size and cost of the vehicle mounted DSRC apparatus can be reduced, and at the same time the power consumption of the vehicle mounted DSRC apparatus can be decreased to a necessary minimum.

In a still further preferred form of the present invention, the modulation system selection part outputs a modulation system instruction signal in response to transmission data from one of the ground devices, determines based on the modulation system instruction signal whether the ASK switch and the QPSK switch are to be turned on or off, and switches the filter property of the first band limiting filter through the filter property switching part. Thus, the size and cost of the vehicle mounted DSRC apparatus can be reduced, and at the same time the power consumption of the vehicle mounted DSRC apparatus can be decreased to a necessary minimum.

In a yet further preferred form of the present invention, the ASK modulator comprises the QPSK modulator. Accordingly, it is possible to reduce the size and cost of the vehicle mounted DSRC apparatus.

In a further preferred form of the present invention, the QPSK modulator includes an input fixing part for fixing the QPSK data input value from the second low pass filter to a prescribed value, the input fixing part being operable to fix the QPSK data input value from the second low pass filter to the prescribed value when the QPSK modulator functions as an ASK modulator in response to transmission data from one of the ground devices. Thus, it is possible to make the QPSK modulator function as an ASK modulator in a reliable manner.

In a further preferred form of the present invention, the vehicle mounted DSRC apparatus further comprises data value matching means for matching the data value output from the second low pass filter with the ASK data value output from the first low pass filter when the QPSK modulator functions as an ASK modulator. The QPSK modulator performs ASK modulation based on the respective data values which are input as the same value from the first and second low pass filters when the QPSK modulator functions as an ASK modulator in response to transmission data from one of the ground devices. Accordingly, it is possible to make the QPSK modulator function as an ASK modulator in a reliable manner, and additionally to reduce the size and cost of the vehicle mounted DSRC apparatus.

In a further preferred form of the present invention, the second band limiting filter limits the band of the ASK data and the band of the other of the I data and the Q data in the QPSK data. The data value matching means comprises: the second band limiting filter; and a filter property switching part for switching the filter property of each of the first and second band limiting filters in response to transmission data from one of the ground devices. Thus, it is possible to make the QPSK modulator function as an ASK modulator in a reliable manner, and additionally to reduce the size and cost of the vehicle mounted DSRC apparatus.

While the invention has been described in terms of preferred embodiments, those skilled in the art will recognize that the invention can be practiced with modifications within the spirit and scope of the appended claims.

What is claimed is:

1. A vehicle mounted DSRC apparatus which uses a dedicated short range communications system of an intelligent transport system including ground devices, and which outputs an ASK modulated signal or a QPSK modulated signal in response to transmission data from one of said ground devices, said vehicle mounted DSRC apparatus comprising:
an antenna for receiving transmission data from said ground devices, and for transmitting said ASK modulated signal and said QPSK modulated signal to said ground devices;
an ASK data generation part in an ASK modulation part for generating ASK data in response to said transmission data;
a QPSK data generation part in a QPSK modulation part for generating QPSK data containing I data and Q data in response to said transmission data;
a first band limiting filter in said QPSK modulation part for band limiting one of said I data and said Q data in said QPSK data and said ASK data;
a second band limiting filter for band limiting the other of said I data and said Q data in said QPSK data;
an ASK low pass filter for removing harmonic components from said ASK data which has passed through said first band limiting filter;
a first low pass filter in said QPSK modulation part for removing harmonic components from said QPSK data which has passed through said first band limiting filter;
a second low pass filter for removing harmonic components from said QPSK data which has passed through said second band limiting filter;
an ASK modulator for ASK modulating said ASK data from said ASK low pass filter;
a QPSK modulator for QPSK modulating said QPSK data from said first and second low pass filters;
a power supply for supplying electric power to said ASK modulator and said QPSK modulator; and
a power amplifier for amplifying output data from said ASK modulator or said QPSK modulator to a desired level thereby to output it to said antenna as said ASK modulated signal and said QPSK modulated signal.

2. A vehicle mounted DSRC apparatus which uses a dedicated short range communications system of an intelligent transport system including ground devices, and which outputs an ASK modulated signal or a QPSK modulated signal in response to transmission data from one of said ground devices, said vehicle mounted DSRC apparatus comprising:
an antenna for receiving transmission data from said ground devices, and for transmitting said ASK modulated signal and said QPSK modulated signal to said ground devices;
an ASK data generation part for generating ASK data in response to said transmission data;
a QPSK data generation part for generating QPSK data containing I data and Q data in response to said transmission data;
a first band limiting filter in said QPSK modulation part for band limiting one of said I data and said Q data in said QPSK data and said ASK data;
a second band limiting filter for band limiting the other of said I data and said Q data in said QPSK data;
an ASK low pass filter for removing harmonic components from said ASK data which has passed through said first band limiting filter;
a first low pass filter for removing harmonic components from said QPSK data which has passed through said first band limiting filter;
a second low pass filter for removing harmonic components from said QPSK data which has passed through said second band limiting filter;
an ASK modulator for ASK modulating said ASK data from said ASK low pass filter;
a QPSK modulator for QPSK modulating said QPSK data from said first and second low pass filters;
a power supply for supplying electric power to said ASK modulator and said QPSK modulator;
a power amplifier for amplifying output data from said ASK modulator or said QPSK modulator to a desired level thereby to output it to said antenna as said ASK modulated signal and said QPSK modulated signal; and
a filter property switching part for switching the filter property of said first band limiting filter in response to transmission data from one of said ground devices.

3. A vehicle mounted DSRC apparatus which uses a dedicated short range communications system of an intelligent transport system including ground devices, and which outputs an ASK modulated signal or a QPSK modulated signal in response to transmission data from one of said ground devices, said vehicle mounted DSRC apparatus comprising:
an antenna for receiving transmission data from said ground devices, and for transmitting said ASK modulated signal and said QPSK modulated signal to said ground devices;
an ASK data generation part for generating ASK data in response to said transmission data;

a QPSK data generation part for generating QPSK data containing I data and Q data in response to said transmission data;

a first band limiting filter in said QPSK modulation part for band limiting one of said I data and said Q data in said QPSK data and said ASK data;

a second band limiting filter for band limiting the other of said I data and said Q data in said QPSK data;

an ASK low pass filter for removing harmonic components from said ASK data which has passed through said first band limiting filter;

a first low pass filter for removing harmonic components from said QPSK data which has passed through said first band limiting filter;

a second low pass filter for removing harmonic components from said QPSK data which has passed through said second band limiting filter;

an ASK modulator for ASK modulating said ASK data from said ASK low pass filter;

a QPSK modulator for QPSK modulating said QPSK data from said first and second low pass filters;

a power supply for supplying electric power to said ASK modulator and said QPSK modulator; and a power amplifier for amplifying output data from said ASK modulator or said QPSK modulator to a desired level thereby to output it to said antenna as said ASK modulated signal and said QPSK modulated signal, wherein said ASK low pass filter comprises said first low pass filter.

4. The vehicle mounted DSRC apparatus according to claim 3, further comprising:

an ASK switch inserted between said power supply and said ASK modulator for turning on and off the supply of electric power to said ASK modulator;

a QPSK switch inserted between said power supply and said QPSK modulator for turning on and off the supply of electric power to said QPSK modulator; and a modulation system selection part for turning on only one of said ASK switch and said QPSK switch.

5. The vehicle mounted DSRC apparatus according to claim 4, wherein said modulation system selection part outputs a modulation system instruction signal in response to transmission data from one of said ground devices, determines based on said modulation system instruction signal whether said ASK switch and said QPSK switch are to be turned on or off, and switches the filter property of said first band limiting filter through said filter property switching part.

6. The vehicle mounted DSRC apparatus according to claim 3, wherein said ASK modulator comprises said QPSK modulator, and wherein said QPSK modulator includes an input fixing part for fixing the QPSK data input value from said second low pass filter to a prescribed value, said input fixing part being operable to fix the QPSK data input value from said second low pass filter to said prescribed value when said QPSK modulator functions as an ASK modulator in response to transmission data from one of said ground devices.

7. The vehicle mounted DSRC apparatus according to claim 3, wherein said ASK modulator comprises said QPSK modulator, and said vehicle mounted DSRC apparatus further comprising data value matching means for matching the data value output from said second low pass filter with the ASK data value output from said first low pass filter when said QPSK modulator functions as an ASK modulator, wherein said QPSK modulator performs ASK modulation based on the respective data values which are input as the same value from said first and second low pass filters when said QPSK modulator functions as an ASK modulator in response to transmission data from one of said ground devices.

8. The vehicle mounted DSRC apparatus according to claim 7, wherein said second band limiting filter limits the band of said ASK data and the band of the other of said I data and said Q data in said QPSK data, and said data value matching means comprises:

said second band limiting filter; and a filter property switching part for switching the filter property of each of said first and second band limiting filters in response to transmission data from one of said ground devices.

* * * * *